United States Patent [19]
Zutz

[11] 3,826,020
[45] July 30, 1974

[54] DEVICE FOR TEACHING SCULPTURING

[76] Inventor: Joseph Zutz, 1447 S. Holt Ave., Los Angeles, Calif. 90035

[22] Filed: Sept. 24, 1970

[21] Appl. No.: 75,004

[52] U.S. Cl.................................. 35/26, 35/41
[51] Int. Cl. ................................... G09b 19/10
[58] Field of Search .............. 35/26, 41; 142/42, 56

[56] References Cited
UNITED STATES PATENTS

| | | | |
|---|---|---|---|
| 1,469,554 | 10/1923 | Crowder | 35/26 UX |
| 2,712,189 | 7/1955 | Grossman | 35/26 X |
| 2,887,791 | 5/1959 | Garbutt | 35/41 |
| 3,123,919 | 3/1964 | Meador | 35/26 |
| 3,301,725 | 1/1967 | Frontera | 35/26 X |

OTHER PUBLICATIONS

Chapman, Cartoon in Washington Daily News, Sept. 8, 1960, page 2.

Clay-Adams Catalog No. 105, 1953, page 93 only.

*Primary Examiner*—Harland S. Skogquist
*Attorney, Agent, or Firm*—Irvin A. Lavine

[57] ABSTRACT

A device for teaching sculpturing including a block of material on plural surfaces of which are printed topographical representations of a figure to be sculpted; the topographical representation is in the form of areas having the projected shape of portions of the figure at particular elevations from a datum, with the areas representing the same elevation having similar indicating means, such as numbers, letters or colors. A set of sculpturing tools is provided, with a coding indication correlated to the indicating means on the areas of the block.

6 Claims, 3 Drawing Figures

PATENTED JUL 30 1974　3,826,020
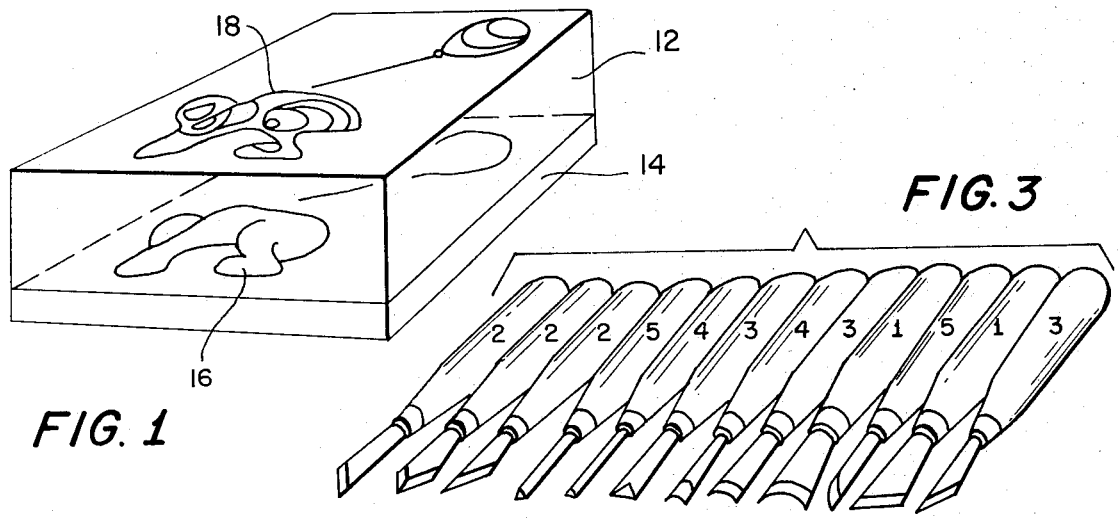
FIG. 1
FIG. 3
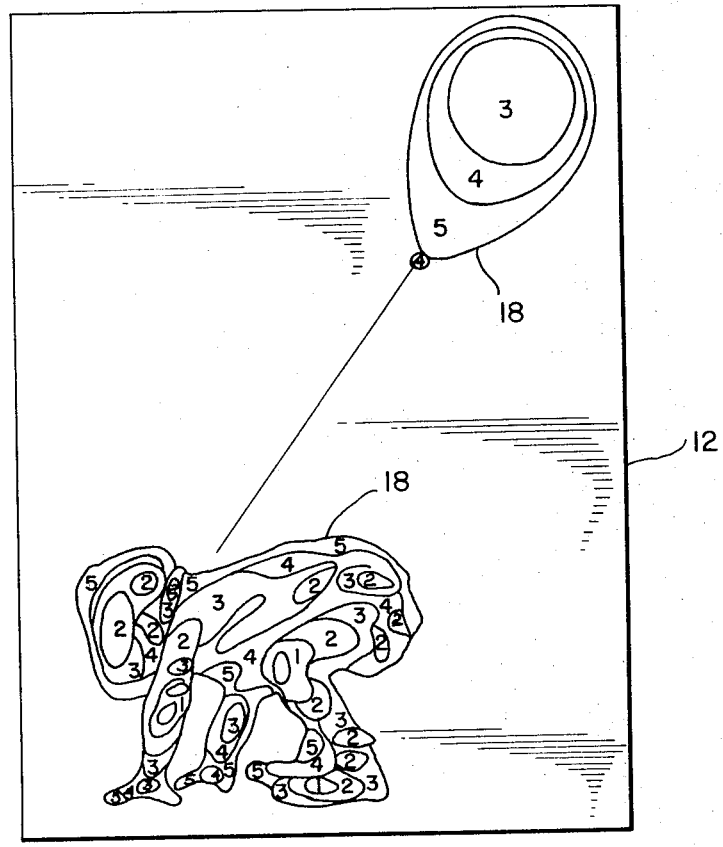
FIG. 2
INVENTOR
JOSEPH ZUTZ
BY Lavine, Cantor & Reich
ATTORNEYS

DEVICE FOR TEACHING SCULPTURING

BACKGROUND OF THE INVENTION

The present invention pertains to a device for aiding in the teaching of sculpturing.

Sculpturing has long been recognized as being a difficult and abstract art. Typically, a block or mass of material is selected from which a chosen figure is to be sculpted. This is accomplished by removing these portions of the mass or block which are extraneous to the sculpted figure which is to be obtained. Initially, relatively large chips or portions of the mass are removed, and as the sculptor approaches the figure which is to be "freed" from the block, smaller and finer chips are removed, until eventually the sculpted object figure is left. Thereafter, finishing, such as cleaning, sanding, polishing, painting, tinting, and/or antiquing, and mounting steps are used to produce the final sculpted art work.

For beginners, the sculpting of a figure is most difficult, because the beginner has great difficulty in envisioning the figure to be sculpted and its position within the block relative to the exterior surface of the block at any given time. As a consequence, portions of the mass or block are often removed by the beginner, who thereafter finds that he has, to his dismay, made an error which is often impossible to correct.

There have been previous attempts made to assist the beginning sculptor in removing the extraneous portions of the mass or block. Typically, these have comprised a figure surrounded with a plurality of layers of material capable of being carved or cut away. These layers have been made of various materials, such as wax and clay, and different layers have been given different colorings. In addition, it has been suggested that, with such a sculpturing aid, on one or more surfaces of the basic block there may be provided an outline of one or more of the layers or coatings; this was provided merely in order to suggest to the sculptor the shape of the coatings adjacent the surface on which the outline was placed.

Such known sculpturing aids are so rudimentary that much of the challenge found in the art of sculpturing is eliminated, with consequent elimination of a significant teaching or learning function. In addition, such aids have been relatively expensive to produce, requiring a number of successive dippings or coatings of different-colored materials in order to provide the successive layers which form the gist of these sculpturing aids.

BRIEF SUMMARY OF THE INVENTION

The present invention sculpture teaching device comprises a block or mass of material having on one or more of the exposed surfaces thereof a topographical representation of the figure to be sculpted. This topographical representation may be, for example, printed on the surface of the block, and defines a plurality of areas, each of which represents the shape of a portion of the figure to be sculpted, which shape has a particular elevation relative to some datum plane. In addition, each of the areas is provided with a suitable indicator, such as a number or a color, to readily differentiate one area from the other. A set of sculpturing tools is also provided, with indications thereon correlated to the indications on the topographical representation. By this arrangement, a student sculptor is guided in selecting the tools to be used in each specific cutting area, and is thereby intrinsically taught the use of the appropriate tools.

A particular block or mass in accordance with the present invention may be of generally parallelepipedal shape, and the topographical representations may be placed on five sides thereof. Alternatively, where a bas relief figure is to be achieved, a flat mass may be utilized, with the topographical representation provided only on one broad surface thereof. While reference has been had to numbers and colors, it will be understood that other indicators may be used, such as lines, symbols, names, tints or half tones.

Among the objects of the present invention are to provide a sculpturing teaching device which will assist a beginning sculptor in sculpting a figure from a mass or block; which will provide on the mass or block, representations for assisting in visualizing the figure to be sculpted, for providing representations of a figure to be sculpted which will be readily understood by a beginner, and which will provide inherent guidance and learning functions to the beginning sculptor. In addition, objects of the present invention include the provision of a device for teaching sculpturing which will also teach the selection of appropriate tools, and which will be economical to fabricate.

BRIEF DESCRIPTION OF THE DRAWING

FIG. 1 is a perspective view of a teaching device in accordance with the present invention.

FIG. 2 is a plan view thereof.

FIG. 3 is a perspective view of a set of sculpting tools.

DESCRIPTION OF THE PREFERRED EMBODIMENT

Referring now to the drawings, wherein like or corresponding reference numerals designate like or corresponding elements throughout the several views, there is shown in FIG. 1 a perspective view of a sculpture teaching device in accordance with the present invention. The device, generally designated 10, includes a block 12 mounted upon a base 14. Within the block 12, and adjacent the base 14 there is illustrated a figure 16 which is to be partially sculpted, as a bas relief. Generally speaking, the figure, designated 16, is of a four legged figure (see also FIG. 2) with a baloon or the like attached to it by a string. The figure 16 may be a purely imaginary figure which is to be "freed" from the block 12 by the removal of excess material, in which case the figure 16 is entirely imaginary and is in no way different from or distinct from the extraneous mass of the block 12. In that case, the block 12 will be entirely homogeneous. Alternatively, the block or mass 12 may be made of two different parts, as for example first providing the figure 16 in bas relief, of one material, and then casting or otherwise forming the remainder of the block 12 on and around the figure 16.

By way of example, the figure 16 may be initially cast of a relatively hard material, or of a material of a particular color. Then the extraneous material which is to be removed during the sculpturing operation may be cast on and around a sculpture figure 16, and this material may be a relatively softer material, or material of a different color. Examples of materials which may be used are a hard, high density polyurethane foam and the extraneous material may be a softer, low density polyurethane foam. Also, as will be understood, the extraneous part may first be formed, and then the figure may be moulded into the upper extraneous part by injection moulding, vacuum moulding or centrifugal moulding. In addition, the figure 16 can be initially cast from polyester resin, fibre glass, hydrocal, wax or hard plastaline clay and the material of block 12 to be removed can be made of polyurethane, polystyrene, micro-balloons, plaster, wax or soft plastaline clay.

Whichever of the two above discussed forms the block 12 may take, that is either homogenous or non-homogenous, there is provided on at least one surface thereof a topographical representation of the figure 16, this being designated 18 in FIG. 1. The topographical representation 18 is preferably printed, and several topographical representations are provided on several different surfaces, in the preferred form of the invention. However, for purposes of facilitating the understanding of the present invention, the topographical representation 18 is shown only on the upper surface of the block 12.

Preferably, the topographical representation 18 is printed on the upper surface, although other methods of providing this topographical representation may be utilized.

Referring now to FIG. 2, there may be seen the topographical representation 18. In essence, representation 18 comprises a plurality of areas bounded by generally curved lines. Each of these areas represents the shape of a portion of the figure 16 having a particular elevation relative to, for example, a datum plane provided by the upper surface of the base 14. Areas of representation 18 which represent portions at the same elevation are designated by the same indicators. As shown in FIG. 2, these areas are numbered. Consequently, the student, upon examining the sculpture teaching device 10 and particularly topographical representation 18 will understand that the lower numbers indicate those portions at the highest elevations relative to the datum plane, and the higher numbers represent those areas closer to the datum plane, the representation being, of course, arbitrarily chosen. The important symbolism is that the areas designated by the reference numeral 1 are located, for instance, adjacent the knee and elbow of the figure to be sculpted, and are therefore those portions furtherest removed from the datum plane.

While the indicators shown in FIG. 1 are numerals, it will be understood that another indicating system may be used. Instead of numerals, letters, names, colors, tints, half tones or hatchure lines may be used.

Also, there may be provided on the representation 18, hatchures for indicating elevations of the figure to be sculpted. These hatchures will take the form of lines of different lengths and widths, running in the direction of the slope of that portion of the figure which is represented thereby. These lines may be long, narrow and far apart for a gentle slope and shorter, thicker and closer for a steeper slope.

With whatever indicator system is used, it will be understood that the topographical areas will serve as a guide to the student sculptor. Initially, the student sculptor may wish simply to leave his sculpture in the form comprising a plurality of planes, leaving the finishing into more conventional form until he has gained greater skill. Later on, when he has gained more skill, he will be able to finish the figure to suit his own artistic tastes and/or preferences.

Referring now to FIG. 3, there is shown a set of sculpturing tools, generally designated 20, each of which is provided with an indicator corresponding to the indicators of the topographic representation 18. This will serve as a guide to the student sculptor in the selection of the appropriate tool to use, for removing extraneous material from the mass or block 12 in order to "free" the figure 16. Broad tools will be used for large chips removal, and finer tools for more detailed chip removal.

Additionally, there may be provided a guide for the student sculptor, in the form of independent drawing(s), identical to the topographical representation(s) provided on the mass or block. In this way, even after portions have been removed from the basic sculpturing block 12, the student sculptor will be able to have a reference which will enable him to visualize the figure which is to be sculpted.

By the present invention sculpturing teaching device, a student sculptor is provided with guidance in executing a sculpture, which will enable him to produce a sculpted free standing or bas relief figure, while at the same time instructing him and increasing his skills. The device of the present invention may be economically produced. The present invention also provides guidance in tool selection to the beginning sculptor. This invention will also be seen to help to establish in the mind of the student a procedural approach and mental attitude toward mass in relation to sculpture.

It will be obvious to those skilled in the art that various changes may be made without departing from the spirit of the invention and therefore the invention is not limited to what is shown in the drawings and described in the specification but only as indicated in the appended claims.

I claim:

1. A device for teaching sculpturing comprising a block of material having on at least one surface thereof a topographical representation of a figure to be sculpted from said block,
    said topographical representation comprising a plurality of areas each representing the shape of a portion of the said figure to be sculpted having a particular elevation relative to a datum,
    and indicating means on said topographical representation for indicating the elevation represented by each of said areas.

2. The teaching device of claim 1, said last mentioned means comprising numerals individual to each elevation.

3. The teaching device of claim 1, said last mentioned means comprising colors individual to each elevation.

4. The device of claim 1, and further comprising a set of sculpturing tools having different sizes and shapes, and indicating means on each said tool corresponding to the indicating means on each said area of said topographic representation.

5. The teaching device of claim 1, said block being parallelipipedal and having topographical representations on plural surfaces thereof.

6. The teaching device of claim 1, said block being generally flat and having a said topographical representation on a broad surface thereof.

* * * * *